Aug. 24, 1948.  A. R. STARR  2,448,006
RADIO DIRECTION FINDER
Filed Dec. 29, 1942  2 Sheets-Sheet 1
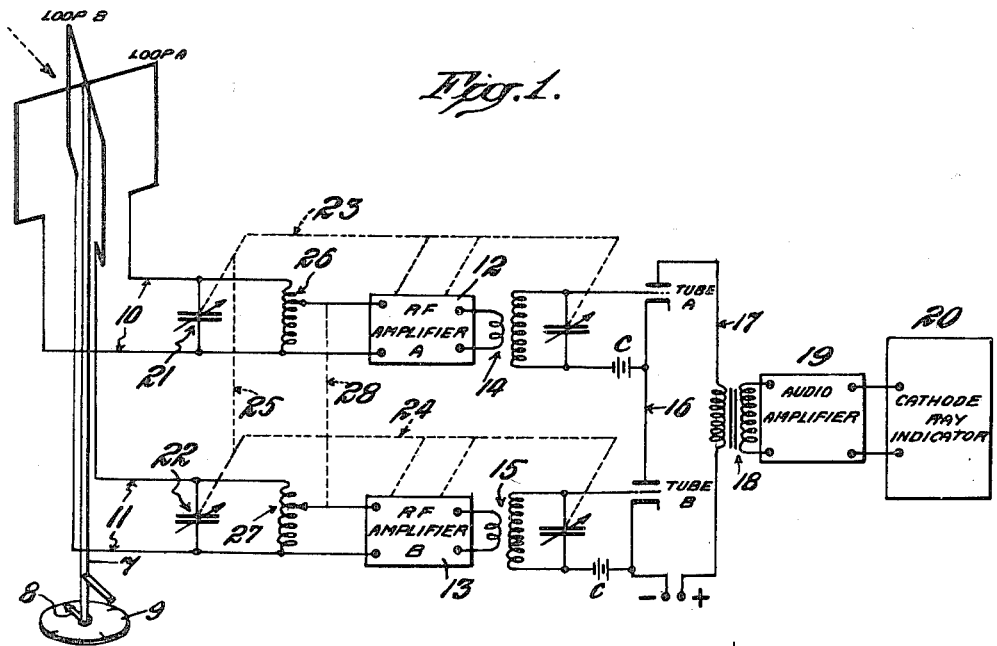
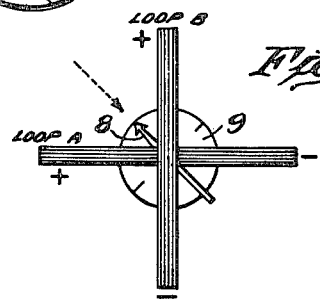
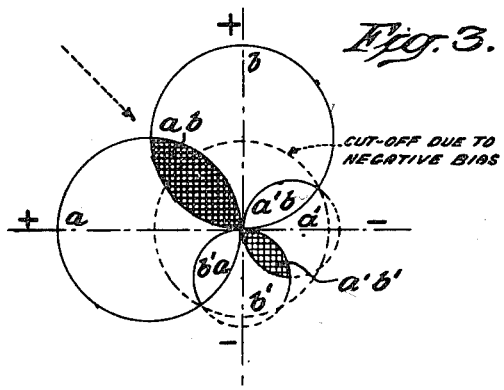
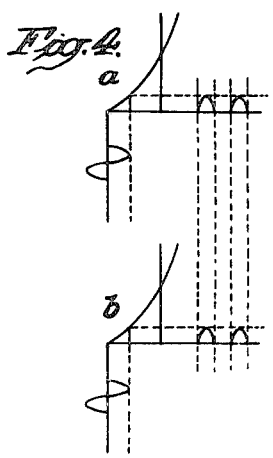
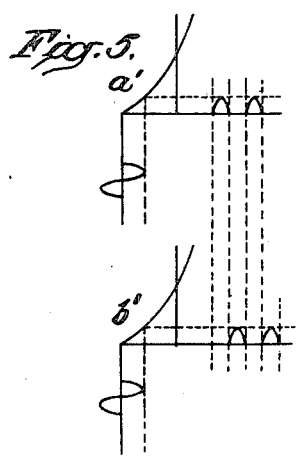
INVENTOR
ALFRED R. STARR
BY
ATTORNEY

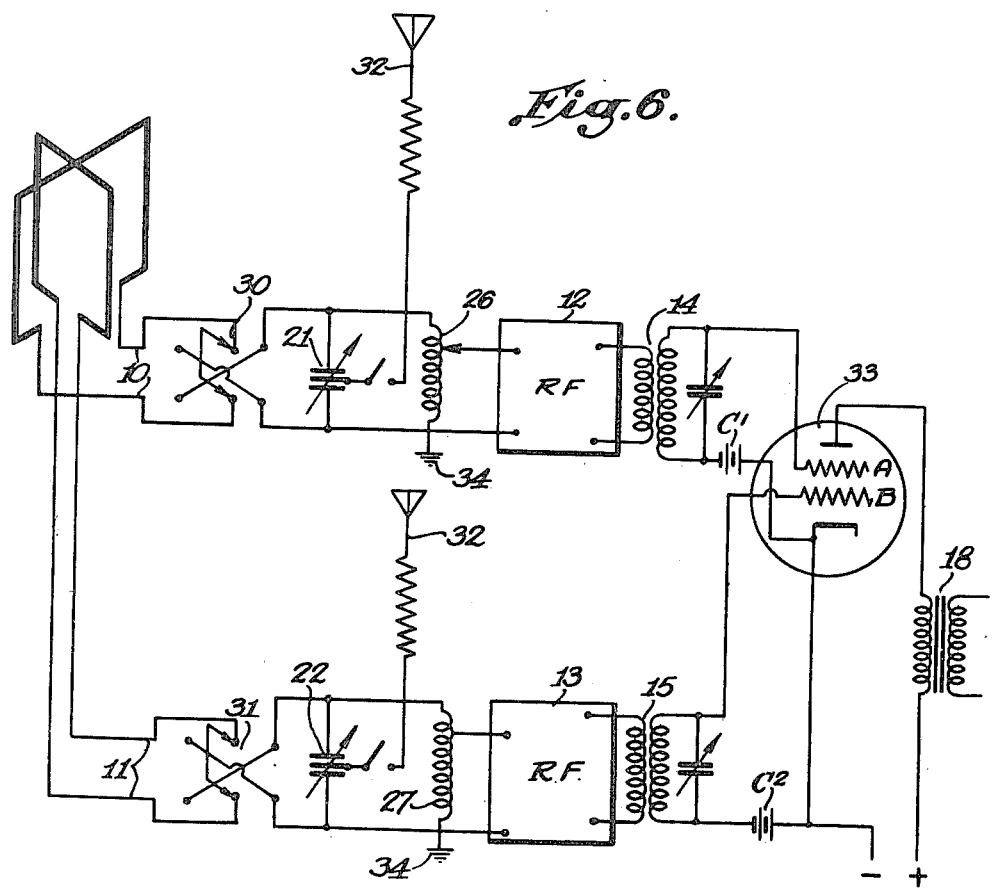

Patented Aug. 24, 1948

2,448,006

UNITED STATES PATENT OFFICE 2,448,006

RADIO DIRECTION FINDER

Alfred R. Starr, New York, N. Y.

Application December 29, 1942, Serial No. 470,522

17 Claims. (Cl. 343—123)

The invention here disclosed relates to direction finders and the purposes of the invention broadly are to operate on the maximum, instead of on the minimum signal as heretofore, where interference has prevented sharp and accurate readings, and to obtain the proper sense of the bearing, so as to know at once the true direction of signal origin.

A further object of the invention is to make it possible to obtain closer and more accurate readings than have been heretofore attainable.

Other desirable objects and the novel features by which all purposes of the invention are attained are set forth or will appear in the course of the following specification.

The drawing accompanying and forming part of the specification illustrates various features and practical embodiments of the invention. It is realized however that such features and structure may be modified and changed in various ways all within the true spirit and broad scope of the invention, as hereinafter defined and claimed.

Fig. 1 is a diagrammatic view illustrative of the complete apparatus.

Fig. 2 is a plan view of the direction finding crossed loop aerials.

Fig. 3 is a diagram of response curves of the two loops superimposed.

Figs. 4 and 5 are comparative reference curves illustrating the in-phase cumulative effect obtained in the direction of the signal and the out-of-phase blocking or cancelling effect of signal forces in the other lobes of the diagram, Fig. 3.

Fig. 6 is a diagrammatic view illustrating a modification.

The apparatus comprises in the first instance, a pair of loop aerials A and B, mounted, preferably in angularly adjustable relation, on a rotatable post or support 7, which may carry an indicator or pointer 8, reading on a direction scale 9.

The respective loops are connected by wiring 10 and 11, with radio frequency amplifiers 12 and 13, identical in respect to gain and selectivity.

The outputs of the R. F. amplifiers are fed into a series plate combining circuit, which may be similar to the one disclosed in the Alfred R. Starr Canadian Patent 246,183. In the present illustration, the R. F. amplifiers are shown coupled by transformers 14, 15, into the plate combining circuit, R. F. amplifier A feeding into the grid of tube A, which is biased to the cutoff point by battery C and amplifier B feeding into the grid of tube B, similarly biased.

The plate circuits of the two tubes are connected in series by connection 16, from the cathode of tube A to the plate of tube B.

The combined plate circuit is shown connected at 17, into the primary of an input transformer 18, feeding into a conventional audio amplifier 19.

The output of audio amplifier 19, may be fed into any suitable indicating device, such as a cathode ray tube 20, loud speaker, electron ray tube, output meter or the like.

The loops are designed with proper inductance to tune to the same frequency as the following R. F. stages, preferably with the same size condensers and these condensers 21, 22, together with the variable condensers of the R. F. amplifiers may be all mounted on one shaft or otherwise mechanically connected as indicated at 23, 24, 25.

These tuning controls of the loops and R. F. amplifiers may all be operated from a single dial as by means of pulleys, belts, gears or other connections.

The R. F. amplifiers may be of conventional or special design and the same is true of the audio amplifier.

Volume controls are indicated at 26, 27, for varying the intensity of the signals from the loops and these are indicated mechanically connected at 28, for operation from a single control knob or the like.

Fig. 3 shows the response curves of the two crossed loops superimposed one on the other, loop A producing the aligned, large and small circular lobes $a$, $a'$ and loop B producing similar lobes $b$, $b'$.

The circuit shown in Fig. 1 is designed so that only parts of the response curves which are common will give a signal response. These parts are shaded to show the overlapping portions of the larger lobes $a$, $b$, producing an elliptical response lobe $a$—$b$, and lesser elliptical lobes $a'$—$b'$, $a$—$b'$ and $b$—$a'$. The lobe $a$—$b$ is the resultant output of the series plate circuit when the instantaneous potentials of both loops are positive. The result is a sharp maximum response in the direction of signal origin. The angle between the crossed loops may be varied as by reducing the included angle between the loops to increase the sharpness of response. The 90° angular relation shown however has proved satisfactory for most purposes.

The properties of the circuit are such that the effects of the lobes of the combined response curves which are not wanted are automatically blocked out and only the effect of the lobe in the sector from which the signal is coming remains.

The ordinary loop direction finder operates on the minimum signal, where interference may prevent obtaining a sharp and accurate reading, whereas in the present invention a sharp signal is obtained in the indicating circuit. This maximum signal is less likely to be affected by interference because the signal-to-noise ratio is greater.

Also the present invention gives the proper sense of the bearing, without going through the second operation of switching in a second antenna, such as has been necessary heretofore. Thus time is saved by getting the correct reading in one operation.

Reversing switches 30, 31, Fig. 6, may be interposed in the leads 10 and 11, to change the polarity of each loop. Then by means of certain combinations of switching, it is possible to choose the sector from which the loops will receive, making it only then necessary to turn the loops through an angle of 90° in order to sweep around a complete circle.

The new circuit has some inherent antenna effect tending to make the circuit unidirectional, the antenna loops being unbalanced as by being grounded at one side of the tuning condensers 21, 22, as at 34, Fig. 6. A vertical antenna 32 may be added or switched in if desired, to eliminate the smaller lobe substantially entirely.

Due to the directional effect, this new system will discriminate against radio interference or "noise" to a greater extent than the ordinary loop direction finder.

For instance, the total noise coming from random directions will be approximately in proportion to the active lobe of the combined response curves, whereas in the ordinary loop, the total noise will be in proportion to the full area of the response curve.

In actual operations only the combined lobe $a$—$b$ of Fig. 3 is effective. The lobes $a'$ and $b'$ are smaller than lobes $ab$ because of antenna effect. As a consequence, the combined lobe $a'b'$ is smaller than the combined lobe $ab$ in the direction of the signal and by reason of the tubes in the series plate circuit being biased beyond the cutoff point, signals in the region $a'$—$b'$ disappear.

Signals in the region of the lobes $a$—$b'$ and $b$—$a'$ also disappear because of the grids of tubes A and B being alternately positive and negative, so that no current will flow in the common plate circuit.

In further explanation of the fact that the undesired sections $ab'$ and $ba'$ are automatically blocked out, it may be assumed that the instantaneous polarity of loop A is such that the grid of tube A is positive and that the polarity of loop B is such that the grid of tube B is positive. Then the plate circuit will be conductive during the positive half cycles as shown on the characteristic curves at $a$ and $b$, Fig. 4. Therefore, any signal in the sector $ab$ will cause a response in the indicating device.

Assuming a signal in sector $ab'$, loop $aa'$ will be positive and loop $bb'$ will be negative. The grid of tube A will be positive and the grid of tube B will be negative at the same instant. During the next half cycle grid of tube A will be negative and grid of tube B positive as represented in Fig. 5. Therefore, no current will flow in the plate circuit and any signal in this sector would not register on the indicating device. Similarly, any signal in sector $b$—$a'$ will be blocked out.

The invention has many uses, for example as a homing device for airplanes, direction finding for airplanes from ground stations, location of enemy planes from ground stations by triangulation, marine direction finding, direction finding on airplanes from beacons, use with reflected signal systems for altimeters and for determining distance and the like.

The apparatus required is relatively simple and inexpensive for the results attained. The system may be further simplified by employing a double grid tube 33, Fig. 6, in place of separate tubes A and B first shown, connected to accomplish the cumulative maximum signal effect from the two crossed loops.

What is claimed is:

1. In a direction finder, the combination of two crossed loop antennas, a radio frequency amplifier for each of said loop antennas, thermionic devices having input circuits connected with said amplifiers and output circuits connected in series relation, said thermionic devices being severally biased to normally prevent current flow in said output circuits and an indicating device connected with the output circuits of said thermionic devices.

2. In a radio direction finder, the combination of two crossed loop antennas, a radio frequency amplifier connected with each antenna, two thermionic devices connected with said amplifiers, said thermionic devices having output circuits connected in series relation, said devices being severally biased to normally prevent current flow in said output circuits, whereby a sharp maximum response is obtained from said loop antennas and indicating means connected with said series connected output circuits.

3. In a radio direction finder, the combination of two crossed loop antennas, amplifiying devices connected therewith, two thermionic devices connected severally with said amplifying devices and having output circuits connected in series relation, said thermionic devices being severally biased to normally prevent current flow in said series connected output circuits and whereby two of the unwanted lobes in the combined response curves of said loop antennas, perpendicular to the direction of signal are cancelled out, leaving a sharp maximum response in the direction of signal.

4. In a radio direction finder, two crossed loop antennas in variable angular relation to one another, dual amplifiers connected therewith, thermionic tube means connected with said dual amplifiers and having plate circuits connected in series and whereby three of the unwanted lobes in the combined response curves are cancelled out by the combined effect of phase relations and properties of said series connected circuits.

5. In a radio direction finder, two crossed loop antennas, an amplifier connected to each antenna, thermionic means having tuned input circuits with grids connected to said amplifiers and plate circuits connected in series relation and signal indicating means connected with said series plate circuits for obtaining unidirectional signal response through phase discriminating properties of said series output circuits.

6. In a radio direction finder, two crossed loop antennas, amplifying devices connected therewith, a dual grid vacuum tube having grid circuits connected with said amplifying devices and biased to normally prevent current flow in the plate circuit of said tube, an audio amplifier connected with said plate circuit and signal indicating means connected with said audio amplifier for sharp maximum unidirectional signal response.

7. In a direction finding system, a plurality of signal intercepting means, amplifying means connected therewith and a signal combining circuit comprising thermionic devices having plate circuits connected in series relation connected with said amplifying means and receptive only to selected desired portions of the response of said plural intercepting means.

8. In a radio direction finder, the combination of two crossed loop antennas, amplifying devices connected therewith and signal responsive devices connected to said amplifying devices and including thermionic devices responsive only to portions of the respective characteristic curves which simultaneously affect said thermionic devices and said thermionic devices having their output circuits connected in series relation and severally biased to normally prevent flow in said output circuits.

9. In a direction finder, two crossed loop antennas, amplifying means connected therewith, an electronic interlocking circuit comprising thermionic devices with their plate circuits connected in series relation for combining the effects of the overlapping portions of two of the lobes of the response curves of said crossed loop antennas to increase the sharpness of the maximum signal response.

10. In a radio direction finding system, a plurality of signal intercepting means and thermionic coincidence devices having plate circuits connected in series relation and receptive only to the common portions of the response of said plural intercepting means.

11. In a direction finding system, a plurality of signal intercepting means and a signal combining circuit comprising a plurality of thermionic devices having plate circuits connected in series relation and receptive only to selected desired portions of the response of said plural intercepting means.

12. In a radio direction finder, a plurality of signal intercepting means in variable angular relation to one another and a plurality of thermionic devices having respective control grid circuits connected to said plural intercepting means and having plate circuits connected in series relation, whereby the desired common portions only of the response of said plural intercepting means are received.

13. In a direction finding system, a plurality of signal intercepting means, amplifying means connected therewith and electronic interlocking means comprising thermionic devices having plate circuits connected with said amplifying means and operable only by signal forces simultaneously present in said intercepting means.

14. In a direction finder, two crossed loop antennas, respective amplifying means therefor and an electronic interlocking circuit, comprising a dual grid vacuum tube having negatively biased grid circuits connected with said amplifying means, whereby current is normally prevented from flowing in the plate circuit of said dual grid tube, and said tube being thereby arranged for selecting and combining only desired portions of the response curves of said crossed loop antennas.

15. In a direction finder, two crossed loop antennas, respective amplifying means therefor and an electronic interlocking combining circuit, comprising a dual grid thermionic device with both grids biased to normally prevent current flow in the plate circuit, for selecting the sharp maximum lobe and for rejecting other undesired lobes of the combined responsive curves of said crossed loop antennas.

16. In a direction finder, the combination of crossed loop antennas, amplifying means therefor and an electronic interlocking and combining circuit for said amplifying means, comprising thermionic devices having plate circuits connected in series relation and including a phase discriminating circuit for eliminating effects represented by undesired lobes of the superimposed curves of said crossed loop antennas.

17. In a direction finder, a plurality of signal intercepting means in angular relation to one another, tuned input amplifiers connected therewith, an electronic interlocking and combining circuit for said amplifiers comprising dual thermionic devices connected in series relation, including a phase discriminating circuit, volume control for said amplifiers, means for effecting simultaneous adjustment of said volume controls and means for effecting simultaneous tuning of said amplifiers.

ALFRED R. STARR.

REFERENCES CITED

The following references are of record in the file of this patent:

UNITED STATES PATENTS

| Number | Name | Date |
| --- | --- | --- |
| 1,723,907 | Alexanderson | Aug. 6, 1929 |
| 1,821,650 | Kolster | Sept. 1, 1931 |
| 2,026,254 | Sandfort | Dec. 31, 1935 |